United States Patent [19]

van der Veen et al.

[11] 4,298,975

[45] Nov. 3, 1981

[54] OPTICAL RECORDING MEDIUM AND METHOD OF OPTICALLY RECORDING INFORMATION THEREON

[75] Inventors: Jan van der Veen; Petrus J. Kivits; Marinus R. J. de Bont, all of Eindhoven, Netherlands

[73] Assignee: U.S. Philips Corporation, New York, N.Y.

[21] Appl. No.: 21,397

[22] Filed: Mar. 19, 1979

[30] Foreign Application Priority Data

Jan. 15, 1979 [NL] Netherlands .................. 7900281

[51] Int. Cl.$^3$ .................. G11B 3/74; G11B 7/00; G01G 15/34; G01D 15/34
[52] U.S. Cl. .................. 369/94; 369/121; 346/76 L; 346/135.1; 346/137; 260/314.5
[58] Field of Search ............. 365/124.4 R; 358/128, 358/128.5; 179/100.3 V; 346/76 L, 135, 135.1; 260/314.5; 430/945

[56] References Cited

U.S. PATENT DOCUMENTS

| | | | |
|---|---|---|---|
| 1,117,419 | 11/1914 | Miller | 280/93 |
| 3,314,073 | 4/1967 | Becker | 346/76 L |
| 3,615,558 | 10/1971 | Carreira et al. | 260/314.5 X |
| 3,853,783 | 12/1974 | Tucker | 260/314.5 X |
| 3,903,107 | 9/1975 | Griffiths et al. | 260/314.5 |
| 3,931,460 | 1/1976 | Watson | 179/100.3 V X |
| 3,990,084 | 11/1976 | Hamisch et al. | 346/76 L |
| 4,069,487 | 1/1978 | Kasai et al. | 346/76 L |
| 4,084,185 | 4/1978 | de Lang et al. | 365/124 X |
| 4,097,895 | 6/1978 | Spong | 179/100.3 V X |

FOREIGN PATENT DOCUMENTS

2826122 12/1978 Fed. Rep. of Germany.

OTHER PUBLICATIONS

"Phtalocyanine Compounds", Moser & Thomas: Reinhold Pub. Corp.

Primary Examiner—Bernard Konick
Assistant Examiner—Aristotelis M. Psitos
Attorney, Agent, or Firm—Norman N. Spain

[57] ABSTRACT

The invention relates to an optical recording system and method in which information can be recorded and read by means of laser light on a recording medium. The recording medium comprises a circular substrate plate which is manufactured, for example, from a transparent synthetic resin and has a diameter from 5–50 cm and which is provided on at least one side with a recording layer consisting entirely or substantially entirely of a compound of phthalocyanine with a metal, metal oxide or metal halide. A very suitable recording layer is a layer of vapor-deposited vanodyl phthalocyanine in a maximum thickness of 200 nm. A metal layer of, for example, tellurium may be provided between the substrate and the recording layer or on the side of the recording layer remote from the substrate. The recording medium may also comprise an optically readable servo track. Upon recording information the element is exposed to pulsatory laser light, pits and/or holes being formed in the recording layer. Analog recording is possible. The element can be read both in transmission and in reflection.

12 Claims, 10 Drawing Figures

OPTICAL RECORDING MEDIUM AND METHOD OF OPTICALLY RECORDING INFORMATION THEREON

The invention relates to an optical recording medium on which information can be recorded and read by means of laser light, the medium comprising a disc-shaped substrate having a dye-containing recording layer on at least one side.

Such a recording medium is disclosed in GB-PS No. 1,117,419 and comprises, for example, a circular glass plate having provided thereon a recording layer containing 16.6% by weight of a triphenyl methane dye and 83.4% by weight of a cellulose nitrate binder. With a thickness of 2 μm the recording layer has an optical density of 1.1 with respect to laser light having an emission wave length of 6328 Angstroms. When recording information, the recording layer is exposed to pulsed laser light with a pulse time of $10^{-6}$ sec., originating from a laser having a power of 50-70 mW. In the exposed places, the dye decomposes and a colourless spot (bit) in a blue background is obtained. This known recording medium device is manufactured by providing a solution of the dye and the binder in a large quantity of organic solvent on one side of a glass plate and then evaporating the solvent.

Such a process is rather time and energy consuming because for good process control the evaporated solvent has to be recovered. Other disadvantages of the known medium are the requirements for an expensive and very energy-rich laser, the comparatively low recording rate and the condition that the information recorded on the medium has to be read in transmission by means of laser light.

It is an object of the instant invention to provide a recording medium in which information can be recorded at a comparatively high speed and with the use of a laser having a low power and which furthermore presents the possibility of reading the recorded information not only in transmission but also in reflection by means of laser light.

A more specific object of the invention is to provide a recording medium on which information can be recorded at a rate of from $10^6$ to $10^8$ bits per second while using a low-power laser. A very suitable laser is a solid-state laser, for example an AlGaAs (aluminium-gallium-arsenic) laser, the small dimensions of which present a significant advantage during assembly, with a power of at most 15 mW and preferably with a power of 2 to 10 mW. The emission wavelength of the AlGaAs laser is roughly 800-870 nm.

Still another object of the invention is to provide a recording medium which in a favourable embodiment presents the possibility not only of digital recording but also analog recording of information.

According to the invention, one or more of these objects are achieved with an optical recording medium of the type mentioned in the opening paragraph which is characterized in that the recording layer consists entirely or substantially entirely of a compound of phtalocyanine and a metal, metal oxide or metal halide.

In general the recording layer will consist entirely of the above-mentioned phtalocyanine compound. However, it is possible, for example, as a result of the process employed, for example, vapour deposition or swinging, that the layer contains impurities, which at most amount to 5% by weight.

Phtalocyanine compounds of metals, metal oxides and metal halides are sufficiently known from literature, reference being made to the handbook "Phtalocyanine compounds" of Frank H. Moser and Arthur L. Thomas, edited in New York by Reinhold Publishing Corporation, and to Mol. Cryst. Liq. Cryst. 33, pp. 149-169 (1976).

Examples of suitable substances include phtalocyanine compounds with VO, Sn, Cu, ClCu, Ni, Co, Al, ClAl, Pt, Mg, Zn and Mo.

The phtalocyanine compounds are stable substances which can readily withstand high temperatures of, for example, 50° C, and a high humidity of, for example, 95%. These compounds have a low heat of evaporation and can easily be vapour-deposited on a substrate. These compounds also exhibit a low thermal conductivity which is very much desired for use in a recording device and which, for example, is a factor 10-100 smaller than that of metals.

A simple but efficacious embodiment of the optical recording medium embodying the invention comprises a disc-shaped substrate plate provided on one side with a single recording layer having a thickness of at most 200 nm and preferably a thickness smaller than 150 nm, consisting entirely or substantially entirely of vapour-deposited phtalocyanine compound. The substrate plate is a circular disc which ensures the desired rigidity. The disc has a diameter of approximately 5-50 cm and a thickness of 0.5 to 5 nm. The disc is preferably manufactured from a material which is transparent to the laser light used, for example, glass. Other very suitable materials are transparent synthetic resins, for example, polymethylmethacrylate (PMMA), PVC, polysulphone, polycarbonate or polyalkylenes, for example, polyethylene or polypropylene. Polymethyl is particularly suitable.

When recording information, the recording medium is exposed to modulated laser light which is focused through the substrate or is focused directly on the recording layer. The exposure through a transparent substrate has the advantage that the irregularities present at the surface fall outside the depth of focus of the objective which focuses the laser light.

As a result of the exposure, either pits, that is to say recessed areas which do not extend throughout the thickness of the recording layer, are formed in the exposed areas or holes are formed in the exposed areas dependent on the energy of the laser beam employed. The formation of holes or pits in the recording layer of phthalocyanine compound is a complex process in which not only does the evaporation of the molecules plays a part but also possible recrystallizations occur. The pits or holes that are formed have small dimensions with diameters in the order of magnitude of 0.2-3 μm and as a rule from 0.2-1.5 μm. Thus the required laser energy is small. For example, in a comparative thick recording layer of vanadylphthalocyanine (VOPc) of 170 nm, deposited on a glass substrate, holes may be formed by exposure for 500 ns with a laser having a power of 3.4 mW on the plate and an emission wavelength of 800 nm.

The recorded information can be read very well not only by transmission but also by reflection, that is to say with a favourable modulation depth. The modulation depth is defined as the quotient of the difference between a bit signal and background signal and the sum of the two signals. Expressed in a formula the modulation depth is $$(\delta_b - \delta_a)/(\delta_b + \delta_a)$$

wherein $\delta_a$ and $\delta_b$ respectively, denote the signal of the background and that of the bit (pit or hole).

Thus according to the present invention there is provided a recording medium in which, in contrast with the prevailing view, a single layer of a phtalocyanine compound, is used as a recording layer which can be read in reflection. In this connection reference is made to IEEE Journal of Quantum Electronics, Vol. QE-14, No. 7, pp. 487-495, July 1978.

The phthalocyanine compounds used in the recording device according to the invention exhibit a high absorption and reflection for light of particular in the higher wavelength ranges of 550-850 nm. In particular in reflection, there also exists an important relationship between value of reflection and thickness of the layer of phtalocyanine compound as a result of which analog recording is possible. This will be discussed in detail.

The values of the optical constants n and k of the substance vanadyl phthalocyanine as a function of the wavelength are shown in FIGS. 1 and 2 of the drawing. From this it may be observed that vanadylphtalocyanine reaches a k-value of 1.0 and more at a wavelength between 650 and 800 nm, which is a very high value for organic dyes.

FIG. 3 of the drawing shows a graph in which the absorption, reflection and transmission of a layer of vanadylphthalocyanine is shown at a wavelength of 849 nm (AlGaAs laser) as a function of the layer thickness.

The use of the phthalocyanine compounds of the invention has several advantages, for example, these compounds are highly stable at high temperatures and humidity conditions the use only of low power lasers for recording of information with a vapor deposition process. These compounds may be applied to the substrate by a simple favorable signal-to-noise ratio. The low power requirement for the laser used in recording is due in particular to the favorable absorption, the small heat of evaporation and the low thermal conductivity of the phthalocyanine compounds. It should be noted that when metallic recording layers are used, the exposed parts (bits) have to melt after which the molten material retracts to form a rim in which a high energy barrier has to be overcome. The favourable signal-to-noise ratio is also due to the fact that no rim or only a rim of very small dimensions is formed around the formed holes or pits.

An interesting advantage over metallic recording layers is to be seen in the fact that an analog recording of information is possible in a recording layer of the phtalocyanine compounds of the invention. A pit and-/or a hole can be formed in the recording layer which, on the basis of differences in reflection, can be read individually. This means that at least three distinct possibilities are present per information bit, that is to say, no hole or pit, a pit, or a (hole) perforation. So in comparison with digital recording, a much larger information density can be obtained. In fact, for the recording of, for example, 64 characters, 6 bits ($64 = 2^6$) are necessary for digital recording, whereas for analog recording with three possibilities, only 4 bits are necessary ($64 < 3^4$).

The recording layer of phthalocyanine compound in the recording medium of the invention may be provided on its surface remote from the substrate with a metallic reflection layer, for example, a layer of Te, Ge, Bi or a chalcogenide glass.

Such a recording medium is exposed through the substrate, to form holes or pits in the exposed places in both the metal layer and the layer of phtalocyanine compound. It has been found that by using a phtalocyanine compound the recording energy is significantly lower than when such a layer of phtalocyanine compound is omitted.

In a favourable embodiment of the recording medium of the invention the substrate is provided on the side of the recording layer with an optically readable servo track which has at least partly a relief structure of servo areas located alternately at a higher and a lower level and corresponding to the stored servo data. The servo track usually is in the form of a spiral or is constructed from concentric circles, the servo areas situated alternately at a higher or a lower level giving the track a crenelated profile. The longitudinal dimensions of the servo areas which show the shape of blocks and pits, vary in agreement with the stored servo data and are roughly from 0.3 to 3 μm. The height difference between blocks and bits is a quarter wavelength of the laser light with which the servo track and the servo data are read optically and in phase.

The recording medium of the invention in which a servo track is present has the significant advantage that the recording of information in the recording layer is controlled accurately by the servo data which are present in the servo track and which comprise, for example, orders with respect to the speed of information recording and the site of recording. The laser light beam scanning the servo track, hereinafter termed servo laser light, transmits the servo data to a control mechanism for, for example, a second laser light beam of a significantly higher energy content with which the desired information can be recorded in the recording layer.

The recording of information preferably takes place in those parts of the recording layer which are situated on the servo track between the servo data.

The servo track may be provided in the surface of the substrate plate but may also be present in a layer of, for example, a synthetic resin, for example, a light-cured layer of lacquer, provided on the surface of the substrate. A substrate having a lacquer layer containing the servo track may be manufactured, for example, by means of a matrix. For this purpose, a liquid, light-curable lacquer is provided on a matrix surface having the servo track, the transparent substrate plate is then laid hereon and the assembly is light-cured via the substrate plate, after which the substrate plate with the cured lacquer layer connected thereto and in which the servo track is copied, is taken from the matrix surface. A substrate provided with a servo track can be manufactured by means of a molding, injection moulding or compression moulding process by means of a jig.

In a further favourable embodiment of the recording medium of the invention a reflective metal layer is provided between the substrate and the recording layer containing the phtalocyanine compound.

When recording information, such a recording medium is exposed to laser light on the side of the recording layer, pits or holes being formed in the recording layer in the exposed places dependent on the quantity of laser light used. Analog recording of information is also possible in this embodiment. The device is read in reflection. The metal layer is, for example, Al, Ni, Bi. Very good results are obtained with a layer of Te, or a Te-containing chalcogenide glass in a thickness of at least 20 nm.

In a further favourable embodiment, a recording layer is used in the optical recording medium of the invention consisting entirely or substantially entirely of a layer of vapour-deposited vanadylphtalocyanine or tinphtalocyanine in thickness of at most 200 nm. Both substances have a good capacity of absorption and reflection at a wavelength of 800-850 nm and make the use of the above-mentioned AlGaAs laser very attractive.

An extremely suitable recording layer is a vapour-deposited amorphous layer of vana-dylphtalocyanine. Such a layer can be produced in a simple manner by vapour-depositing vanadylphtalocyanine on a substrate which is maintained at a comparatively low temperature of at most 40° C. The advantage of an amorphous layer is that the graininess of the surface is minimum so that the noise of the recording device is minimum upon reading.

The invention also relates to a method of recording information in which a recording element is exposed to laser light modulated in accordance with the information to be processed and is characterized in that a medium device of the invention is exposed to laser light with an emission wavelength of 800-870 nm, pits or holes being formed in the recording layer of the phtalocyanine compound which can be read in reflection by means of laser light. A solid-state laser is preferably used having a power of at most 15 mW and with a pulse time of $10^{-6}$ to $10^{-8}$ sec.

The advantage of this method is that information can be recorded and read in reflection while using a very attractive, cheap laser light source, with little energy and at a comparatively high speed.

As compared with reading in transmission, reading in reflection presents the advantage that the optical apparatus required for recording and reading is simplified considerably because the forward and reflected laser light beam follows the same optical path to a considerable extent. When reading in reflection, in particular fewer optical elements, such as objectives, are necessary.

In a favourable embodiment of the method according to the invention the recording layer present in the optical device and containing the phtalocyanine compound is directly exposed to laser light of different energy content, bits of different depth dimensions being formed in the recording layer and being capable of being read in reflection.

In this preferred embodiment there is analog recording of information.

The invention will be described in greater detail with reference to the drawing, in which FIG. 1 shows a graph in which the optical constant k of VOPc is plotted against the wavelength in nm.

Figure 1:
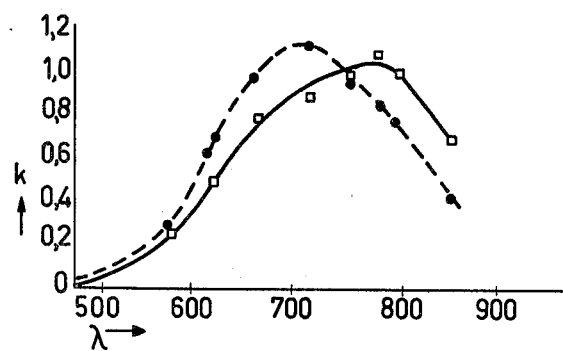
Figure 2:
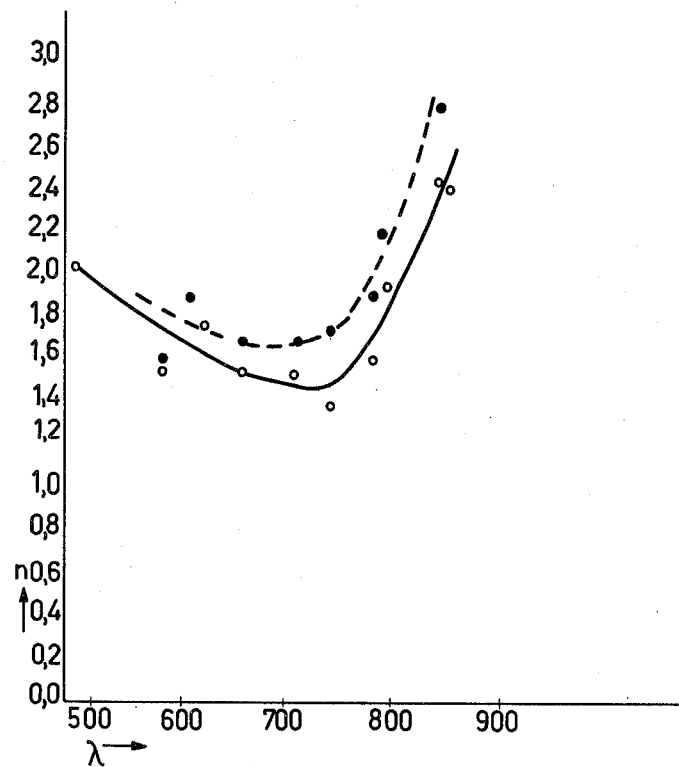
FIG. 2 shows a graph in which the index of refraction n of VOPc is plotted against the wavelength.

As shown in FIGS. 1 and 2, the values of k and n, respectively, depend not only on the wavelength of the laser light used but also to a small extent on the thickness of the VOPc layer. In both graphs, two lines are drawn, the broken line denoting the values of k and n, respectively, of a layer having a thickness above 40 nm and the solid line denoting the values of k and n, respectively, of a layer below a thickness of 40 nm.

Figure 3:
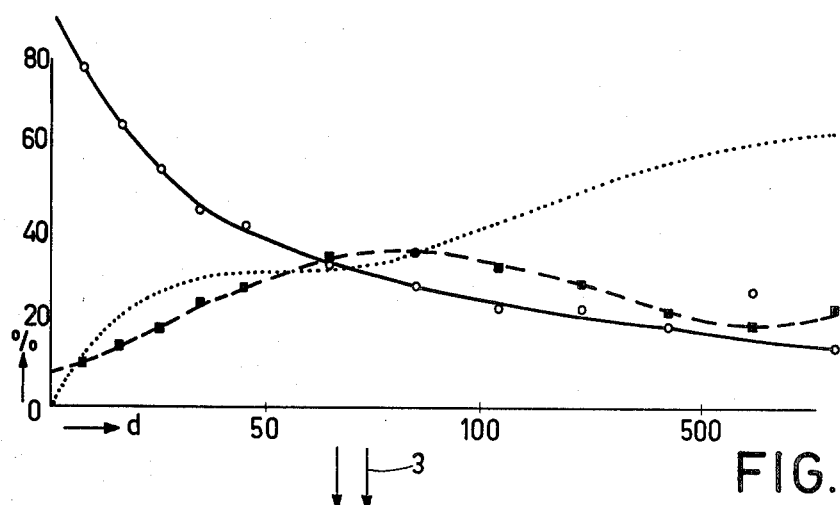
FIG. 3 shows a graph in which the absorption, reflection and transmission of an amorphous layer of VOPc provided on glass is plotted against the layer thickness in nm.

FIG. 3 shows the absorption, reflection and transmission at a wavelength of 849 nm as a function of the layer thickness and expressed in percent. The reflection is denoted by a broken line, the absorption line is dotted and the transmission line is denoted by a solid line. Upon closer consideration of the reflection line shown in FIG. 3 it appears that analog recording of information is possible on the basis of the reflection differences shown at varying layer thicknesses. More in particular, starting from a comparatively thick layer, an analog recording which can be read in reflection can be achieved which presents three distinct possibilities, namely the layer itself, a pit having a depth corresponding to half the layer thickness, and a perforation or hole.

Figure 4:
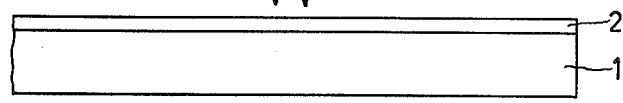
FIG. 4 is a cross-sectional view of a recording device according to the invention prior to exposure.

Reference numeral 1 in FIG. 4 denotes a 2 mm thick disc-shaped substrate of polymethylmethacrylate which is provided on one side with a vapour-deposited layer of vanadylphtalocyanine in a thickness of 80 nm. The vapour deposition was carried out in a vacuum bell at a vapour deposition temperature of 550° C. During the vapour deposition the substrate remained at a temperature lower than 40° C. so that an amorphous, that is to say an X-ray amorphous, layer of vanadylphtalocyanine was obtained. The recording medium thus manufactured was exposed to pulsatory laser light in the direction of the arrows 3, the light originating from a laser having a power on the plate of 6 mW and an emission wavelength of 800 nm. The pulse time was 200 ns. As a result of the exposure, holes were formed in the layer 2 so that the situation shown in FIG. 5 was achieved. It is to be noted that the medium can also be exposed via plate 1.

Figure 5:
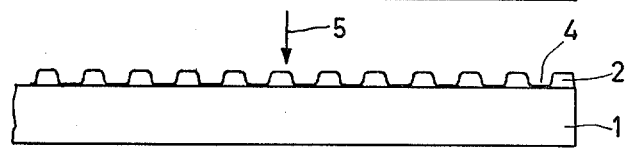
FIG. 5 is a cross-sectional view of the recording device shown in FIG. 4 after exposure.

In FIG. 5 the same reference numerals are used as in FIG. 4 for corresponding components. The holes (information bits) obtained in the layer 2 are denoted by reference numeral 4. The digitally recorded information can be read in reflection by means of laser light which is denoted by the arrow 5 and which is, for example a factor 10 weaker than the recording laser light. The modulation depth in reflection was 11%.

Figure 6:
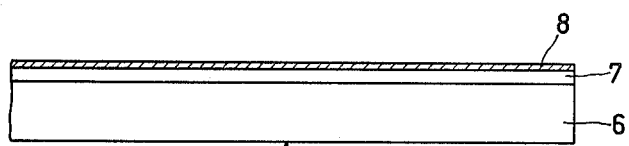
FIG. 6 is a cross-sectional view of another embodiment of the device according to the invention prior to exposure.

Reference numeral 6 in FIG. 6 denotes a transparent PVC plate of 1 mm thickness which is provided with a vapour-deposited layer of tin phtalocyanine in a thickness of 25 nm. On the surface remote from the PVC plate 6, the layer 7 has a metal layer 8 consisting of $Ge_{20}/Te_{80}$ in a thickness of 40 nm. The element is exposed to pulsatory laser light in the direction denoted by the arrow 9. The pulse time was 100 ns. The laser used has a power on the plate of 8.8 mW, and an emission wavelength of 800 nm.

Figure 7:
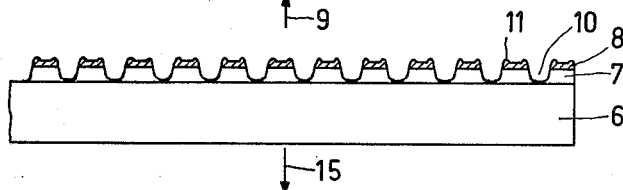
FIG. 7 is a cross-sectional view of the embodiment shown in FIG. 6 after exposure.

In the exposed plces a hole is formed both in the layer 7 and in the layer 8. The situation thus obtained is shown in FIG. 7 in which the same reference numerals are used as in FIG. 6 for identical components. Reference numeral 10 in FIG. 7 denotes a hole obtained by exposure, a rim 11 of metal being formed around the hole in the metal layer 8. The digitally recorded information can be read in reflection both via the substrate and directly from the air (air incidence).

Figure 8:
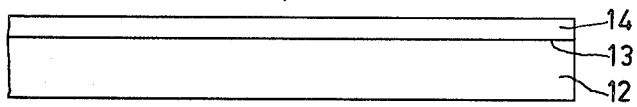
FIG. 8 is a cross-sectional view of still another embodiment of the device in accordance with the invention prior to exposure.

Reference numeral 12 in FIG. 8 denotes a 1 mm thick substrate plate of glass which is provided at its surface 13 with a vapour-deposited layer of vanadylphtalocyanine 14 in a thickness of 105 nm. The device is exposed to pulsatory laser light in the direction denoted by the arrow 15, the light originating from a laser having a power of 4 mW on the plate and an emission wavelength of 800 nm. The pulse time was 400 and 1000 ns. In the exposed places pits and holes were formed in the layer 14 dependent on the pulse time.

Figure 9:
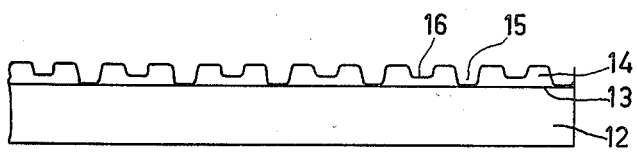
FIG. 9 is a cross-sectional view of the device shown in FIG. 8 after exposure.

This situation is shown in FIG. 9 in which the same reference numerals are used as in FIG. 8. Holes 15 are formed in the layer 14 as a result of exposure for a pulse time of 1000 ns, and pits 16 obtained by exposure for a pulse time of 400 ns.

The device is read in reflection in the direction denoted by arrow 17. The modulation depths achieved having the following values:

modulation depth hole relative to non-exposed surface: 40% modulation depth pit relative to non-exposed surface: 22% modulation depth hole relative to pit: 20%.

Figure 10:
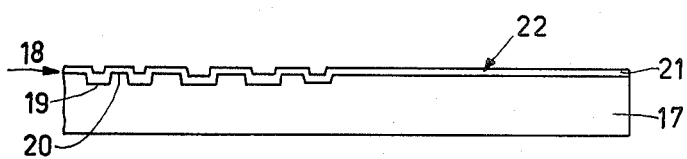
FIG. 10 is a cross-sectional view of a recording device in accordance with the invention having a servo track.

Reference numeral 17 in FIG. 10 denotes a transparent substrate of polymethylmethacrylate in a thickness of 1 mm which is provided on one side with a servo track 18 having a crenelated profile of areas 19 situated at a lower level and areas 20 situated at a higher level. The longitudinal dimensions of the areas 19 and 20 vary in agreement with the stored servo information which comprise data as regards to speed of recording and place of recording, and roughly amount to between 0.3 and 3 $\mu$m. The difference in height between areas 19 and 20 is approximately 0.2–0.3 $\mu$m. On the side of the servo track 18 the substrate plate 17 is provided with a recording layer 21 consisting of vanadylphtalocyanine in a thickness of 100 nm. The servo track is read in reflection via the substrate by means of weak laser light. On the basis of servo information the device is exposed to laser light in the part 22 not provided with servo data so as to record the desired information.

What is claimed is:

1. A recording system comprising a means for providing an information modulated laser beam and a recording medium positioned in the path of said laser beam, said recording medium comprising a substrate, transparent to said laser beam, provided on at least one side with a recording layer consisting at least substantially entirely of a compound of phthalocyanine and a metal, metal oxide or a metal halide.

2. The recording system of claim 1 wherein on the side of the substrate wherein the recording layer is present there is also present an optically readable servo track having at least partially a relief structure of servo areas corresponding to the stored servo data.

3. The recording system as claimed in claims 1 or 2 characterized in that the substrate in the recording medium is selected from the group consisting of glass and transparent synthetic resins.

4. The recording system of claim 3 wherein the substrate is formed of a transparent synthetic resin selected from the group consisting of polymethylmethacrylate, polyethylene, polypropylene, polycarbonate and polyvinyl chloride.

5. The recording system of claim 1 wherein, in the recording medium, a reflecting metal layer is provided between the substrate and the recording layer.

6. The recording system of claim 5 wherein the metal layer comprises tellurium or a chalcogenide glass containing tellurium in a thickness of at least 20 nm.

7. The recording system of claim 1 wherein the recording layer in the recording medium consists at least substantially of a layer of vapor-deposited vanadyl phthalocyanine or tin phthalocyanine in a layer thickness of at most 200 nm.

8. The recording system of claim 7 wherein the recording layer in the recording medium consists of a vapor-deposited amorphous layer of vanadyl phthalocyanine.

9. A method of recording information in which a recording medium is exposed to a laser beam modulated in accordance with desired information, characterized in that the recording medium comprising a substrate transparent to said laser beam and coated on at least one side with a recording layer consisting at least substantially entirely of a compound of phthalocyanine and a metal, a metal oxide or a metal halide is exposed to an information modulated laser beam having an emission wavelength of 800 to 870 nm to thereby form pits or holes in said recording layer, said pits or holes being capable of being read in reflection by means of laser light.

10. The method of claim 9 wherein the recording layer present on the recording medium is exposed directly to laser beams of different energy contents thereby forming pits of different depth dimensions in the recording layer which pits are capable of being read in reflection by means of laser light.

11. An optical recording medium upon which information can be recorded and read by means of laser light, said medium comprising a substrate selected from the group consisting of glass and synthetic resins transparent to laser radiation provided on at least one side with a recording layer consisting at least substantially entirely of vanadyl phthalocyanine or tin phtalocyanine in a layer thickness of at most 200 nm.

12. An optical recording medium of claim 11 wherein the recording layer consist of a vapor deposited amorphorous layer of vanadylphtalocyanine.

* * * * *